(12) United States Patent
Falls et al.

(10) Patent No.: US 11,940,042 B2
(45) Date of Patent: Mar. 26, 2024

(54) GEARBOX SELF CONTAINED BREATHING SYSTEM

(71) Applicant: Textron Innovations Inc., Providence, RI (US)

(72) Inventors: Alan W. Falls, Arlington, TX (US); Charles H. Speller, Oak Point, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/877,629

(22) Filed: Jul. 29, 2022

(65) Prior Publication Data

US 2024/0035558 A1 Feb. 1, 2024

(51) Int. Cl.
*F16H 57/02* (2012.01)
*F16H 57/027* (2012.01)

(52) U.S. Cl.
CPC .................. *F16H 57/027* (2013.01)

(58) Field of Classification Search
CPC ............................. F16H 57/027; F16H 57/031
See application file for complete search history.

(56) References Cited

U.S. PATENT DOCUMENTS

| 3,686,973 | A | * | 8/1972 | Davison, Jr. | ............ F16H 57/04 74/606 R |
| 3,722,321 | A | * | 3/1973 | Walker | ..................... F16H 57/04 74/606 R |
| 4,351,203 | A | * | 9/1982 | Fukunaga | ........... F16H 57/0483 74/606 R |
| 10,584,788 | B2 | * | 3/2020 | Taylor | ................... F16H 57/027 |
| 2004/0025691 | A1 | * | 2/2004 | Vanderhoof | ......... B01D 53/261 96/108 |
| 2017/0138461 | A1 | * | 5/2017 | Chory | ................. F16H 57/0458 |

FOREIGN PATENT DOCUMENTS

| DE | 4018601 A1 | * | 12/1990 | |
| DE | 102009058065 A1 | * | 6/2011 | ........... F16H 57/027 |
| JP | 2004225753 A | * | 8/2004 | ........... F16H 57/027 |

* cited by examiner

*Primary Examiner* — Adam D Rogers
(74) *Attorney, Agent, or Firm* — Frost Brown Todd LLP

(57) ABSTRACT

Breathing systems and methods for a gearbox is described. Embodiments preferably create a closed system for air within the gearbox. As an operating gearbox warms the air or fluid within, or an altitude change causes air to expand or contract, increased pressure can result and air can escape through tubing to a cannister. The cannister can receive the expanding air in an impermeable cavity that is proximate to a bladder open or partially open to an exterior environment. Air can press on the bladder, expanding the cavity and shrinking the bladder until a pressure equilibrium is reached. As operation of the gearbox is lowered or powered off, or another altitude change occurs, the air can cool and/or retract into the gearbox. The bladder can then expand and press on the cavity until equalizing the pressure within the cannister.

16 Claims, 6 Drawing Sheets

US 11,940,042 B2

GEARBOX SELF CONTAINED BREATHING SYSTEM

STATEMENT REGARDING FEDERALLY SPONSORED RESEARCH OR DEVELOPMENT

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD

The present disclosure is directed to gearboxes for vehicle transmissions.

BACKGROUND OF THE INVENTION

During aircraft operation, transmissions go through a cycle of being cold, then up to operating temperature, and then back down to cold once the aircraft is no longer running. The air inside the gearbox gets warm and expands, and some exits through the breather attached to the gearbox. When cooling down, the box pulls air back in from the atmosphere, which includes any moisture that may be present in the air. Over time, this can contaminate the oil inside the gearbox and lead to maintenance action if not addressed. Similar issues with air expanding and contracting can occur due to altitude changes during flight, with similar contamination of the gearbox.

BRIEF SUMMARY OF THE INVENTION

One embodiment under the present disclosure comprises a breathing system for a gearbox. The system comprises tubing configured to be fluidly coupled to a gearbox and to allow fluid within the gearbox to pass therethrough; and a cannister fluidly coupled to the tubing. The cannister comprises a cavity configured to receive the fluid from the tubing and impermeable to an exterior environment; and a bladder proximate the cavity and configured to expand and contract as fluid enters and exits the cavity from the gearbox.

Another embodiment under the present disclosure comprises a drive system. The system comprises a gearbox configured to house one or more components in a drive system; tubing fluidly coupled to the gearbox and configured to allow fluid within the gearbox to pass therethrough; and a cannister fluidly coupled to the tubing. The cannister comprises a cavity configured to receive the fluid from the tubing and impermeable to an exterior environment; and a bladder proximate the cavity and configured to expand and contract as fluid enters and exits the cavity from the gearbox.

A further embodiment under the present disclosure comprises a method of operating a gearbox. The method comprises allowing expanding air in the gearbox to pass through a tubing to a cannister, the cannister comprising a cavity configured to receive the air from the tubing and impermeable to an exterior environment; and further comprising a bladder proximate the cavity and configured to expand and contract as air enters and exits the cavity from the gearbox. The method further comprises allowing contracting air to enter the gearbox from the cannister.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1A:
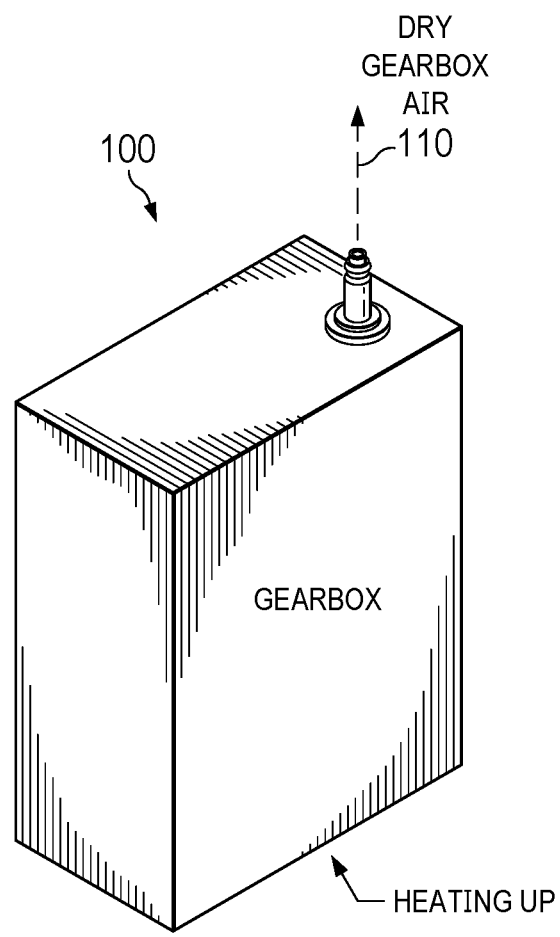
FIGS. 1A-1B are diagrams of a prior art gearbox.
Figure 1B:
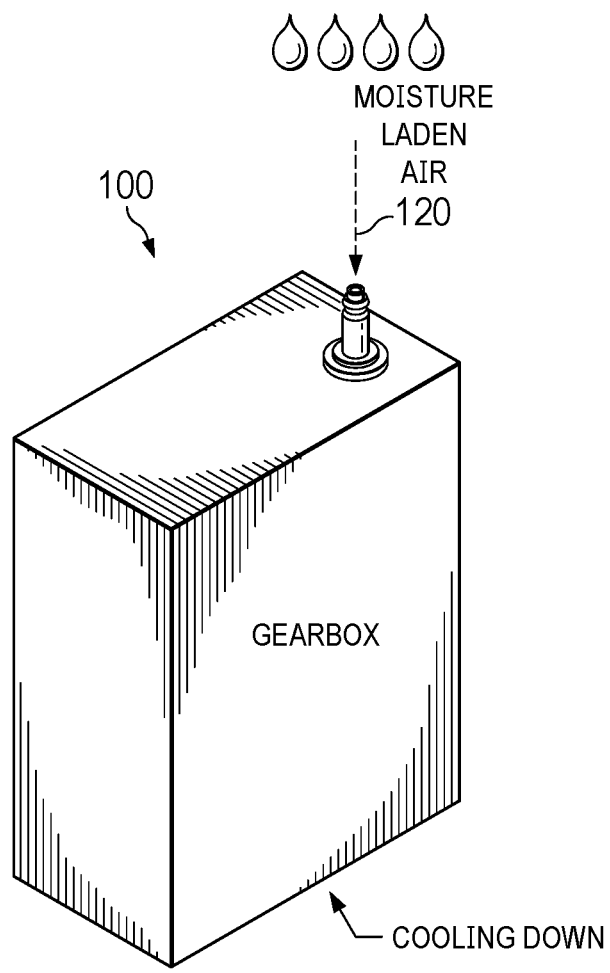

Transmissions in vehicles, such as aircraft, start out cold and warm up during operation, cooling down again once operation is over. Air contained in the transmission gearbox, similarly, begins cold, warms up, and cools down again. As seen in FIGS. 1A and 1B, dry air 110 exits the gearbox 100 as it warms up and upon cooling can draw in moisture 120 or other contaminants. This can contaminate oil in the gearbox 100, leading to accelerated wear and/or corrosion on any gearbox components. Desiccant breathers can help alleviate this problem but also require frequent inspection and replacement.

Embodiments under the present disclosure include breathing systems for gearboxes that avoid the contamination problems seen in the prior art. For example, embodiments can include a cannister coupled to a gearbox, the cannister containing a bladder to form a closed breathing system. This can remove the possibility of moisture laden air entering the gearbox during typical operation without adding maintenance inducing items like desiccants. As air within a gearbox expands, due to heating and/or altitude changes, the air can expand into the cannister instead of to an environment exposed to outside air with contaminants. As the air contracts, due to cooling or altitude changes, the air can contract back into the gearbox without pulling any contaminants with it.

Figure 2A:
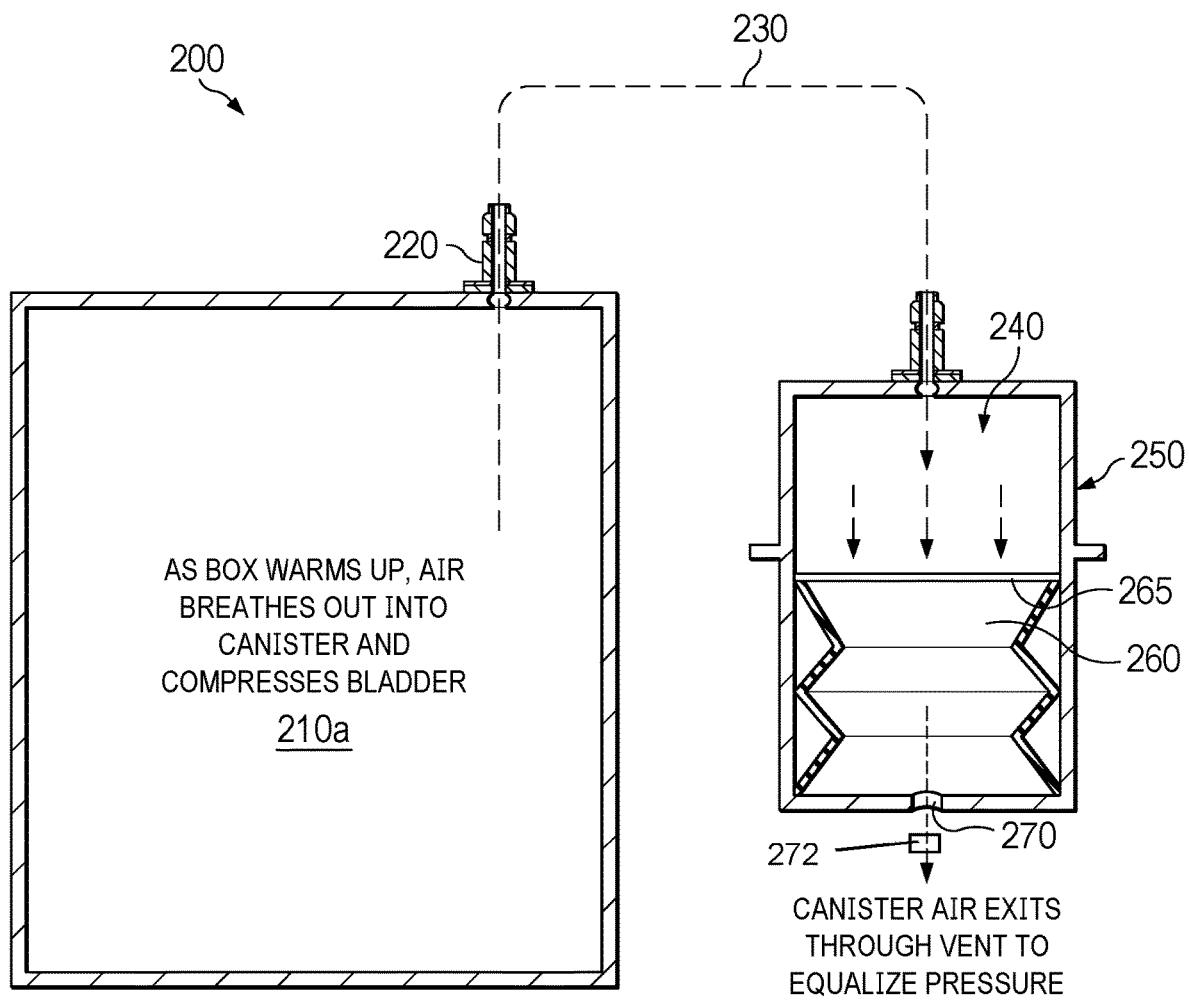
FIGS. 2A-2B are diagrams of a gearbox breathing system under the present disclosure.
Figure 2B:
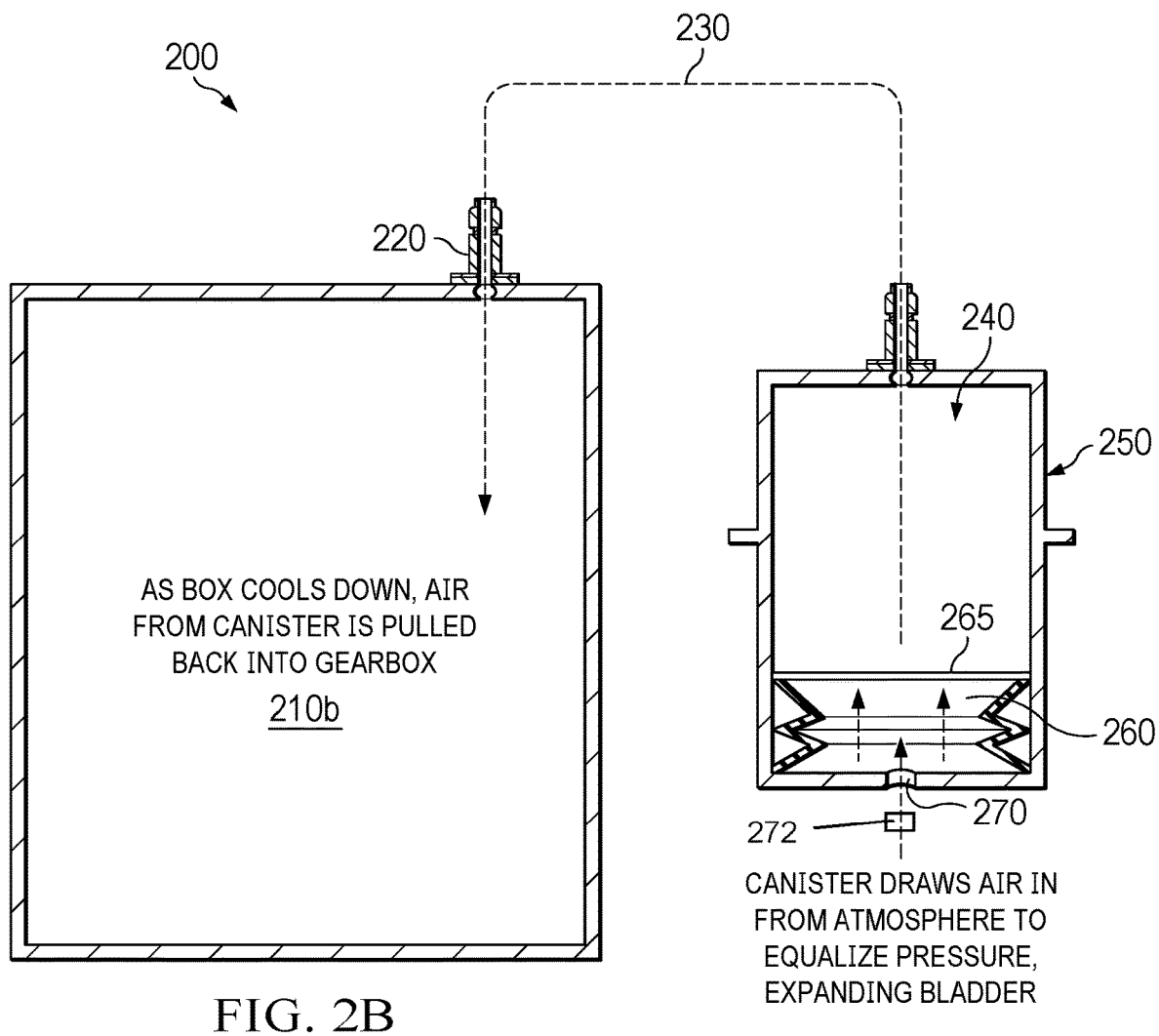

An embodiment under the present disclosure is shown in FIGS. 2A-2B. Gearbox 200 has an outlet 220 that is fluidly coupled to cannister 250 via tubing 230. Cannister 250 comprises cavity 240 fluidly coupled to the gearbox 200, and an impermeable bladder 260 that can expand and retract.

Vent 270 allows air to pass into the bladder 260 but not the cavity 240 of cannister 250. In FIG. 2A, as heated air 210*a* expands (due to operation of the comprising vehicle or machinery), it will at least partially pass through tubing 230 into cavity 240 and press on bladder 260 and (in this view) press bladder 260 downward. This will expand the volume within cannister 250 that is occupied by the cavity 240 and the heated air 210*a*. As operation within the gearbox 200 ends, cooled air 210*b* will condense, exert less pressure on bladder 260 within cannister 250 and at least partially reenter gearbox 200. Bladder 260 will expand into cannister 250 by drawing air through vent 270 until pressure is equalized across the border between the bladder 260 and the cavity 240. Bladder 260 and cavity 240 can share at least one common edge 265, allowing pressure within cavity 240 to press on and move bladder 260 and vice versa. In some embodiments the bladder 260 and cavity 240 may share more than one common edge 265. Common edge 265 can comprise a single layer of material, or multiple layers of material (surfaces of both bladder 260 and cavity 240). Lateral edges of cavity 240 may comprise a gasket, seal, or other mechanism for creating an impermeable barrier while still allowing cavity 240 and bladder 260 to expand and compress. Because this system is closed, no moisture or contaminants will be carried by cooled air 210*b*. This will help protect components within gearbox 200 and thereby extend the life of the components and the gearbox itself.

Reference has been made to heated air in FIGS. 2A-2B. But this disclosure is applicable to expanding and contracting air due to altitude changes or due to any other cause.

Gearbox 200 of FIGS. 2A-2B can comprise a gearbox in an aircraft, a car, other vehicle, a drive system for machines in a factory, or any other gearbox within a bigger system. Gearbox 200 can comprise a transmission gearbox for an engine, an engine nose box, or other types of gearboxes. Gearbox 200 preferably comprises a metal (e.g., aluminum or steel). Gearboxes typically comprise metals or metal alloys. But certain embodiments could comprise plastics or other materials. Fluid within the gearbox will typically be air. But the present disclosure could be used with other fluids.

Cannister 250 is preferably leak proof and sealed to prevent any entry of moisture or other contaminants. Cannister 250 preferably comprises a metal (e.g., aluminum or steel), but other materials are possible. Cavity 240 of cannister 250 can comprise a space within cannister 250, and/or it can comprise an air bladder, pocket, or balloon that is coupled to the tubing 230 and can swell with air from gearbox 200.

Tubing 230, outlet 220, and any other coupling mechanisms to gearbox 200 or cannister 250 are preferably metal. Other materials are possible. And any type of gasket, seals, or other similar components may comprise a variety of materials, e.g., rubbers or plastics.

Bladder 260 can comprise any material that allows for a flexible expansion and compression as pressure from heated and cooled air creates pressure changes. Outlet 270 can optionally comprise a filter 272.

Cannister 250 may be placed in a variety of locations in relation to gearbox 200. Preferably cannister 250 is above the oil level of the gearbox 200. Wherever the cannister 250 is placed, tubing 230 can be lengthened, shortened, widened, or otherwise adjusted to couple gearbox 200 and cannister 250. It is preferable that outlet 220, tubing 230, and outlet 270 are not located near high-speed components within the engine or other system they comprise. High-speed components may create air borne oil droplets that can, over time, accumulate entrapped oil within cavity 240. Alternatively, components such as outlet 220, tubing 230, and outlet 270 can be shrouded to impede the entrance of oil into the breather system.

Figure 3:
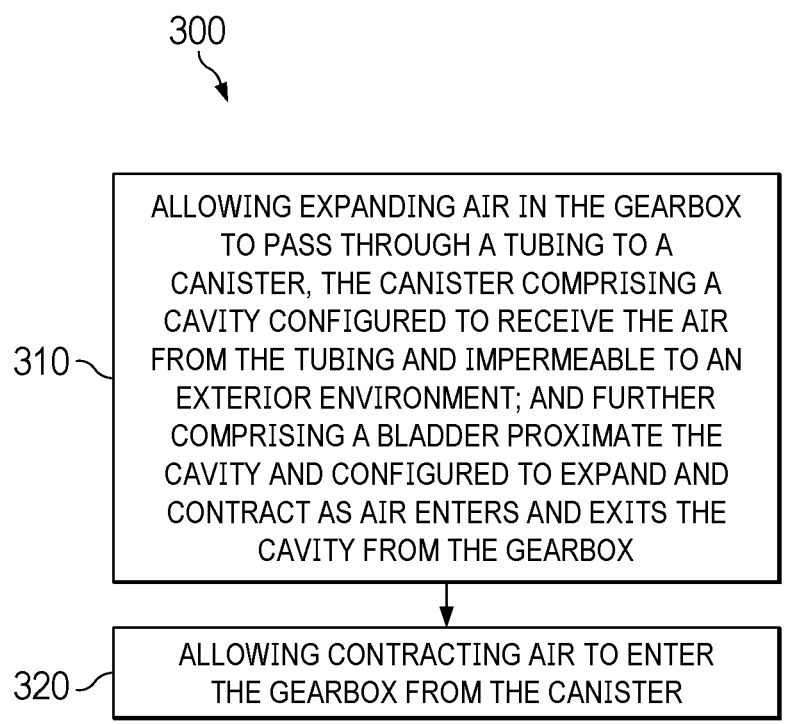
FIG. 3 is a diagram of a method embodiment under the present disclosure.

FIG. 3 shows a possible method embodiment under the present disclosure. Method 300 comprises a method of operating a gearbox breathing system. Step 310 is allowing expanding air in the gearbox to pass through a tubing to a cannister, the cannister comprising a cavity configured to receive the air from the tubing and impermeable to an exterior environment; and further comprising a bladder proximate the cavity and configured to expand and contract as air enters and exits the cavity from the gearbox. Step 320 is allowing contracting air to enter the gearbox from the cannister. This method can further comprise beginning operation of the gearbox, and/or adjusting a level of operation of the gearbox. Alternatively, the method could comprise changing an altitude of the gearbox.

Figure 4:
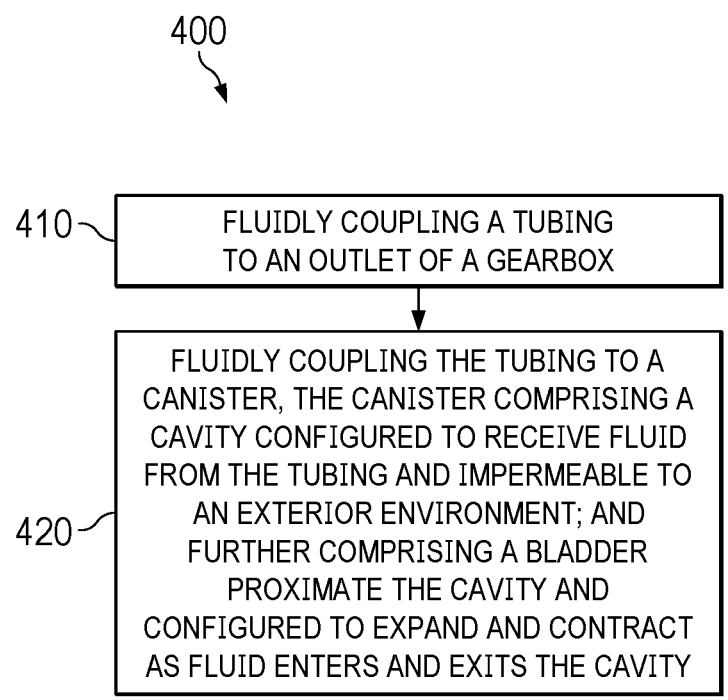
FIG. 4 is a diagram of a method embodiment under the present disclosure.

FIG. 4 shows a possible method 400 of constructing a gearbox breathing system under the present disclosure. Step 410 is fluidly coupling a tubing to an outlet of a gearbox. Step 420 is fluidly coupling the tubing to a cannister, the cannister comprising a cavity configured to receive fluid from the tubing and impermeable to an exterior environment; and further comprising a bladder proximate the cavity and configured to expand and contract as fluid enters and exits the cavity.

ABBREVIATIONS AND DEFINED TERMS

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

CONCLUSION

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by preferred embodiments, exemplary embodiments, and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A breathing system for a gearbox, comprising:
   tubing configured to be fluidly coupled to the gearbox and to allow fluid within the gearbox to pass therethrough; and
   a cannister fluidly coupled to the tubing and comprising:
      a cavity configured to receive the fluid from the tubing and impermeable to an exterior environment; and
      a bladder proximate the cavity and configured to expand and contract as fluid enters and exits the cavity from the gearbox, the bladder comprising an outlet configured to receive air from the exterior environment, wherein the bladder comprises a common edge shared with the cavity, wherein the common edge is flat and the bladder expands and contracts by moving the common edge.

2. The breathing system of claim 1 wherein the cannister further comprises a vent at the outlet to the bladder.

3. The breathing system of claim 1 wherein the outlet comprises a filter.

4. The breathing system of claim 3 wherein the common edge comprises a portion of both the cavity and the bladder.

5. The breathing system of claim 1, wherein the fluid enters the tubing and cannister at least in part due to warming of the gearbox causing the fluid to expand.

6. A drive system, comprising:
   a gearbox configured to house one or more components in a drive system;
   tubing fluidly coupled to the gearbox and configured to allow fluid within the gearbox to pass therethrough; and
   a cannister fluidly coupled to the tubing and comprising:
      a cavity configured to receive the fluid from the tubing and impermeable to an exterior environment; and
      a bladder proximate the cavity and configured to expand and contract as fluid enters and exits the cavity from the gearbox, wherein the bladder comprises a common edge shared with the cavity, wherein the common edge is flat and the bladder expands and contracts by moving the common edge.

7. The drive system of claim 6 wherein the cannister is located above an oil level of the gearbox.

8. The drive system of claim 6 wherein the gearbox comprises a portion of an aircraft.

9. The drive system of claim 6 wherein the gearbox comprises a portion of an automobile.

10. The drive system of claim 6 wherein the bladder is fluidly coupled to the exterior environment.

11. The drive system of claim 6 wherein the bladder comprises a bellows shaped portion.

12. A method of operating a gearbox, the method comprising:
    allowing expanding air in the gearbox to pass through a tubing to a cannister, the cannister comprising a cavity configured to receive the expanding air from the tubing and impermeable to an exterior environment; and further comprising a bladder proximate the cavity and configured to expand and contract as air enters and exits the cavity from the gearbox, wherein the bladder comprises a common edge shared with the cavity, wherein the common edge is flat and the bladder expands and contracts by moving the common edge; and
    allowing contracting air to enter the gearbox from the cannister.

13. The method of claim 12, wherein the expanding air is caused at least in part by an altitude change.

14. The method of operating a gearbox of claim 12, further comprising lowering a speed of operation of the gearbox.

15. The method of operating a gearbox of claim 12 further comprising, allowing air in the bladder to exit the cannister through an outlet as expanding air enters the cavity so as to equalize pressure in the cannister.

16. The method of operating a gearbox of claim 12 further comprising, allowing the bladder to draw air from the exterior environment through an outlet as a speed of operation is lowered to expand to the bladder and equalize pressure in the cannister.

* * * * *